United States Patent
Yoon

(10) Patent No.: US 11,616,359 B2
(45) Date of Patent: Mar. 28, 2023

(54) ESD PROTECTION CIRCUIT

(71) Applicant: Silicon Works Co., Ltd., Daejeon (KR)

(72) Inventor: Jang Hyun Yoon, Daejeon (KR)

(73) Assignee: SILICON WORKS CO., LTD, Daejeon (KR)

( * ) Notice: Subject to any disclaimer, the term of this patent is extended or adjusted under 35 U.S.C. 154(b) by 0 days.

(21) Appl. No.: 17/402,336

(22) Filed: Aug. 13, 2021

(65) Prior Publication Data

US 2022/0052521 A1  Feb. 17, 2022

(30) Foreign Application Priority Data

Aug. 14, 2020 (KR) .......................... 10-2020-0102452

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC ........ H02H 9/046; H02H 1/0007; H02H 9/04; H05F 3/02; H02M 1/32
USPC .......................................................... 361/56
See application file for complete search history.

(56) References Cited

U.S. PATENT DOCUMENTS

| | | | | |
|---|---|---|---|---|
| 5,745,323 A | * | 4/1998 | English | H03K 19/00315 361/111 |
| 9,030,790 B1 | * | 5/2015 | Tanase | H02H 9/04 361/111 |
| 10,177,137 B1 | * | 1/2019 | Altolaguirre | H01L 27/0281 |
| 10,193,338 B2 | * | 1/2019 | Goyal | G06F 3/044 |
| 2015/0214730 A1 | * | 7/2015 | Chuang | H02H 9/04 361/56 |
| 2015/0325568 A1 | * | 11/2015 | Chaudhry | H01L 27/0251 361/56 |
| 2018/0374839 A1 | * | 12/2018 | Tsai | H01L 27/0296 |
| 2019/0173278 A1 | * | 6/2019 | Jang | H02H 9/046 |
| 2020/0083705 A1 | * | 3/2020 | Xavier | H01L 27/0285 |

FOREIGN PATENT DOCUMENTS

| | | | | |
|---|---|---|---|---|
| CN | 109217276 A | * | 1/2019 | ............. H02H 9/046 |
| CN | 209088537 U | * | 7/2019 | ............. H02H 9/046 |
| JP | 2017-050663 A | | 3/2017 | |
| KR | 10-0651579 B1 | | 11/2006 | |
| KR | 2008-0034227 A | | 4/2008 | |
| KR | 2017-0081047 A | | 7/2017 | |

* cited by examiner

*Primary Examiner* — Dharti H Patel

(74) *Attorney, Agent, or Firm* — Polsinelli PC

(57) ABSTRACT

Disclosed is an ESD protection circuit which performs a protection operation by detecting an introduction of an ESD signal when the ESD signal is introduced through a power line. The ESD protection circuit includes a noise detection circuit configured to provide a first detection signal which detects power noise or an ESD signal introduced through a power line; an ESD detection circuit configured to provide a second detection signal which detects an ESD signal introduced through the power line; and a pull-down control circuit configured to perform pull-down on the ESD signal of the power line when the first detection signal which detects the power noise or the ESD signal and the second detection signal which detects the ESD signal are received.

12 Claims, 3 Drawing Sheets

ESD PROTECTION CIRCUIT

BACKGROUND

1. Technical Field

Various embodiments generally relate to an ESD (electrostatic discharge) protection circuit, and more particularly, to an ESD protection circuit which performs a protection operation by detecting an introduction of an ESD signal when the ESD signal is introduced through a power line.

2. Related Art

In general, a home appliance is configured to perform electronic control so as to provide various functions, and includes a micro control unit for the electronic control.

The micro control unit is configured to electrically interface with various external components and perform necessary control. For example, the micro control unit is configured to receive a signal from a signal source such as a sensor, perform digital signal processing on the received signal, and output a digital signal processing result to the outside.

The micro control unit is configured to receive power, required for operation, through a power line. However, high-frequency noise may be introduced through the power line. Thus, the micro control unit requires a design to prevent a malfunction or damage to an internal circuit by high-frequency noise. To this end, an ESD protection circuit for performing power clamping in response to high-frequency noise may be provided in the micro control unit.

For example, a motor is a part which generates a lot of high-frequency noise. Therefore, in a home appliance such as a refrigerator or a washing machine using a motor, a lot of high-frequency noise by the motor may be transferred to a power line, and resulting power noise may be introduced into a micro control unit through the power line.

The ESD protection circuit provided in the micro control unit generally does not have a function of distinguishing whether the high-frequency noise introduced through the power line is caused by the power noise or an ESD signal.

The ESD signal is an electrostatic discharge signal, and is generated to have a high voltage in the form of a short pulse for a very short moment of about several hundreds of nanoseconds. The ESD signal has a relatively higher voltage than the power noise caused by the driving of the motor. Hence, the ESD signal has higher probability of causing a malfunction of the micro control unit or damaging the internal circuit, as compared to the power noise described above.

The ESD protection circuit may be configured to pull down high-frequency noise by using an NMOS transistor to which a resistor and a capacitor are coupled.

Therefore, the ESD protection circuit cannot distinguish the power noise and the ESD signal being high-frequency components, and performs pull-down on both the power noise and the ESD signal. As a result, the micro control unit may perform undesired power clamping for the power noise.

As such, it is difficult for the general ESD protection circuit to perform a selective and stable operation on the ESD signal in an environment including a motor with severe power noise, and as a result, the reliability of the operation of the micro control unit may be degraded.

SUMMARY

Various embodiments are directed to an ESD protection circuit which distinguishes power noise and an ESD signal in high-frequency noise introduced through a power line and selectively performs pull-down, for noise removal, on the ESD signal.

In an embodiment, an ESD protection circuit may include: a noise detection circuit configured to provide a first detection signal which detects high-frequency power noise or a high-frequency ESD signal introduced through a power line; an ESD detection circuit configured to provide a second detection signal which detects the ESD signal exceeding a preset detection voltage; and a pull-down control circuit configured to perform pull-down on the ESD signal of the power line when the first detection signal and the second detection signal are received.

In an embodiment, an ESD protection circuit may include: a noise detection circuit including a capacitor which is connected to a power line, and configured to output a first detection signal by a short current of the capacitor generated at a rising time point of power noise or an ESD signal introduced through the power line; an ESD detection circuit including a level detector which is connected to the power line, and configured to output a second detection signal corresponding to the ESD signal exceeding a detection voltage preset in the level detector; a first switching circuit configured to be turned off in response to the first detection signal by the short current of the capacitor; a second switching circuit configured to be turned off in response to the second detection signal corresponding to the ESD signal exceeding the detection voltage; and a pull-down circuit configured to maintain turn-off by turn-on of at least one of the first switching circuit and the second switching circuit, and pull down the ESD signal of the power line when both of the first switching circuit and the second switching circuit are turned off.

The present disclosure may distinguish an ESD signal in high-frequency noise introduced through a power line, and may perform pull-down only on the ESD signal.

Therefore, the stable operation of an ESD protection circuit may be secured in an environment including a motor with severe power noise, and the reliability of the operation of a micro control unit may be improved.

DETAILED DESCRIPTION

An ESD protection circuit in accordance with an embodiment of the present disclosure is disclosed to distinguish power noise VPN and an ESD signal VESD in high-frequency noise and remove noise by the ESD signal VESD by performing pull-down on the ESD signal VESD. The power noise VPN means high-frequency noise which is introduced into a power line from a high-frequency noise source such as a motor. The ESD signal VESD means high-frequency noise which is introduced into the power line while having a high voltage in the form of a short pulse for a short moment of about several hundreds of nanoseconds by static electricity.

Figure 1:
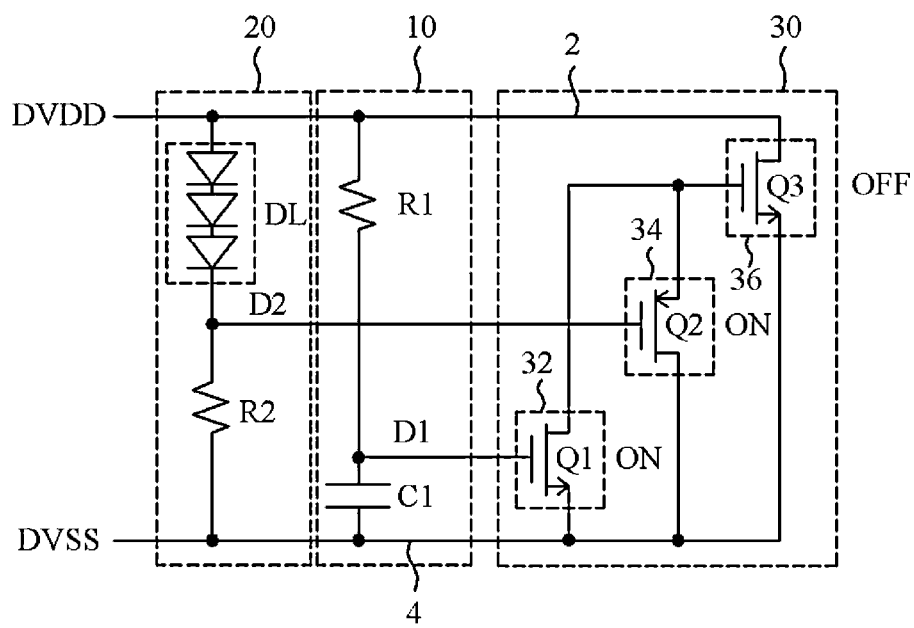
FIG. 1 is a circuit diagram illustrating an ESD protection circuit in accordance with an embodiment of the present disclosure.

As illustrated in FIG. 1, the ESD protection circuit in accordance with the embodiment of the present disclosure may be implemented to include a noise detection circuit 10, an ESD detection circuit 20 and a pull-down control circuit 30.

The noise detection circuit 10 is to provide a first detection signal D1 which detects the power noise VPN introduced through a power line 2. The ESD detection circuit 20 is to provide a second detection signal D2 which detects the ESD signal VESD introduced through the power line 2. The pull-down control circuit 30 is to perform pull-down on the ESD signal VESD of the power line 2 when the first detection signal D1 having detected the power noise VPN and the second detection signal D2 having detected the ESD signal VESD are received.

Among them, the noise detection circuit 10 is disposed between the power line 2 and a ground line 4, and is configured to detect a current change by the power noise VPN introduced through the power line 2 and provide the first detection signal D1 corresponding to the current change when there is the current change.

For example, a constant voltage DVDD may be applied to the power line 2 at a level of 5V, and a constant voltage DVSS may be applied to the ground line 4 at a level of 0V.

The noise detection circuit 10 is configured to include a resistor R1 and a capacitor C1 which are connected in series between the power line 2 and the ground line 4. The resistor R1 is connected to the power line 2, and is to receive the power noise VPN introduced through the power line 2. The capacitor C1 is connected between the resistor R1 and the ground line 4. The first detection signal D1 may be provided from a node between the resistor R1 and the capacitor C1.

Figure 2:
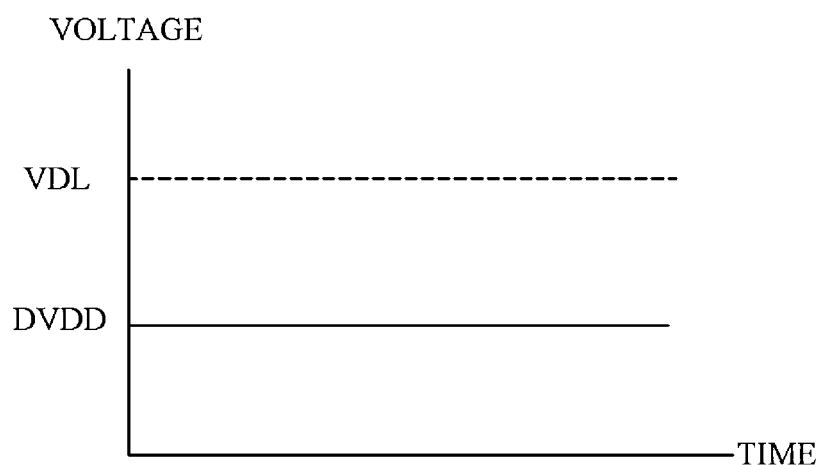
FIG. 2 is a waveform diagram illustrating a state in which a normal constant voltage DVDD is applied.

When the normal constant voltage DVDD illustrated in FIG. 2 is applied through the power line 2, the node between the resistor R1 and the capacitor C1 has a potential by a charging voltage of the capacitor C1. At this time, the first detection signal D1 may have a voltage of a high level, capable of turning on an NMOS transistor Q1 of a first switching circuit 32 to be described later, by the charging voltage of the capacitor C1.

Figure 3:
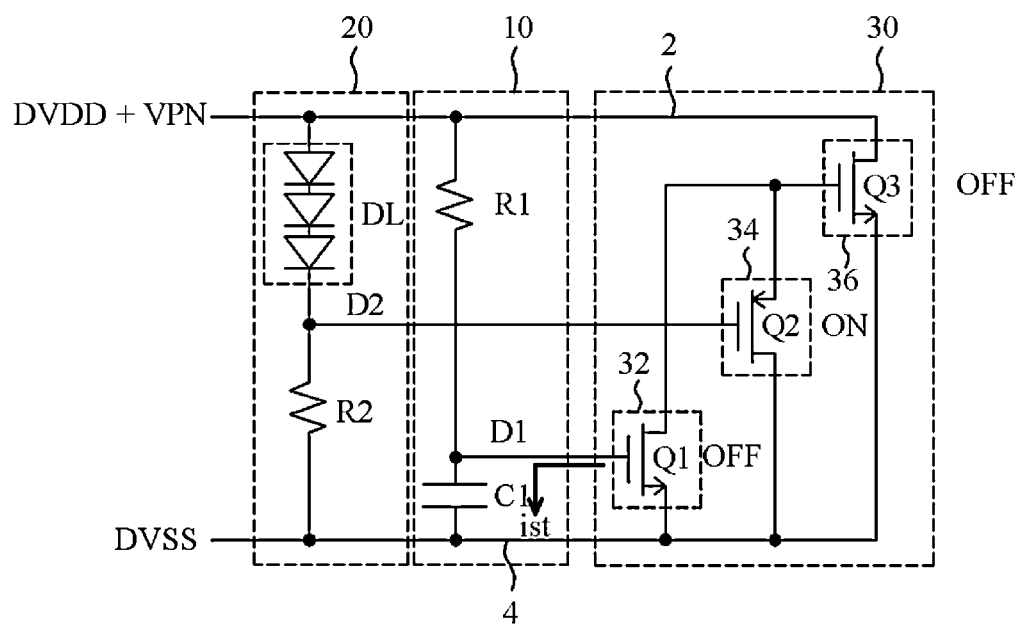
FIG. 3 is a circuit diagram to assist in the explanation of an operation by power noise VPN in the embodiment of FIG. 1.
Figure 4:
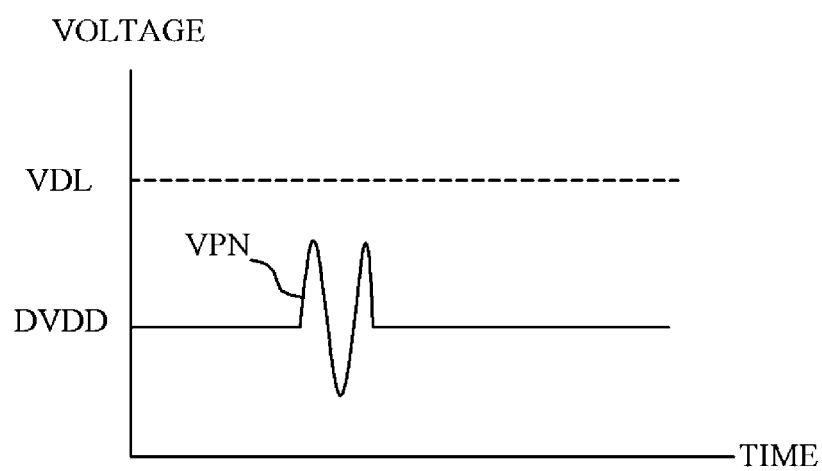
FIG. 4 is a waveform diagram illustrating a state in which the power noise VPN is applied to the constant voltage DVDD.

Unlike this, when the high-frequency power noise VPN is introduced through the power line 2 by being loaded into the constant voltage DVDD as illustrated in FIGS. 3 and 4, the capacitor C1 temporarily forms a short current ist which is discharged to the ground line 4, at a rising time point of the high-frequency power noise VPN. The potential of the node between the resistor R1 and the capacitor C1 is temporarily lowered in response to a current change described above. At this time, the first detection signal D1 may have a voltage of a low level which turns off the NMOS transistor Q1 of the first switching circuit 32, in response to the current change.

Figure 5:
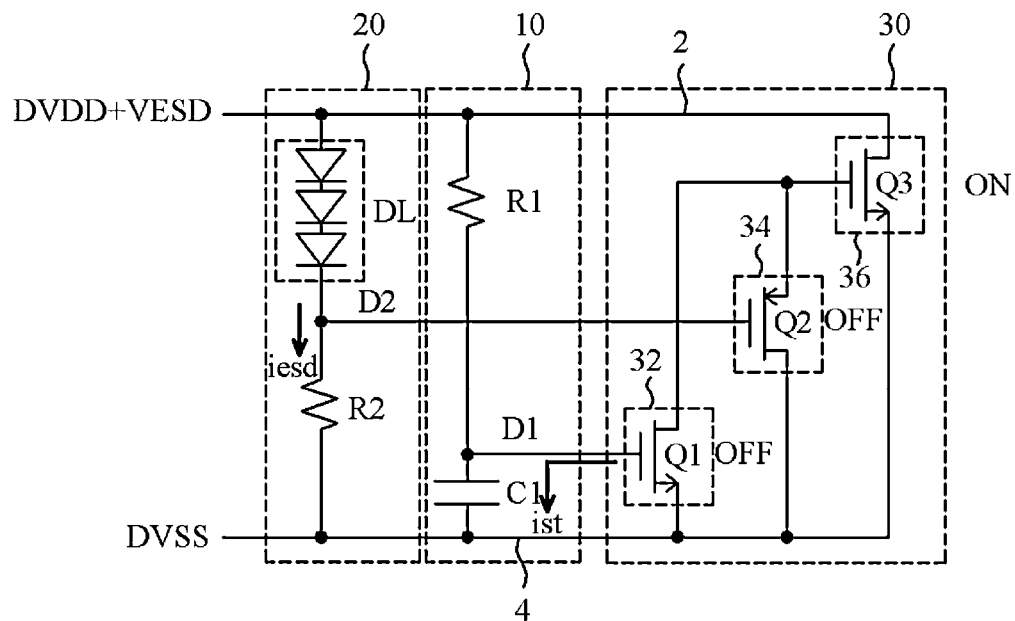
FIG. 5 is a circuit diagram to assist in the explanation of an operation by an ESD signal VESD in the embodiment of FIG. 1.
Figure 6:
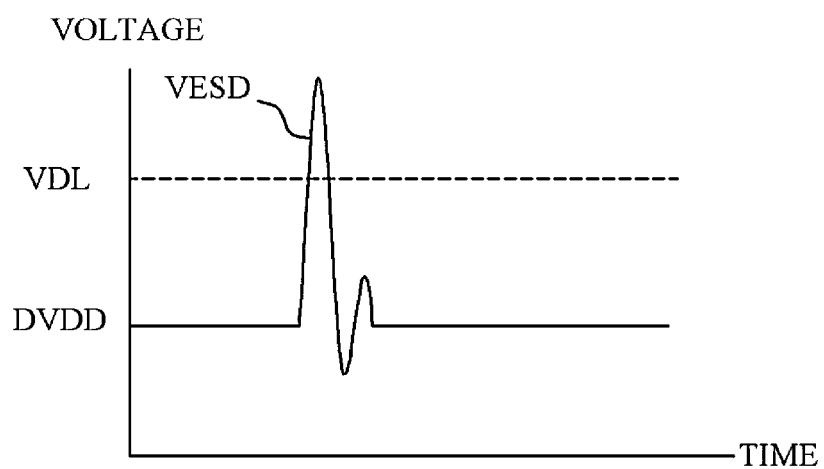
FIG. 6 is a waveform diagram illustrating a state in which the ESD signal VESD is applied to the constant voltage DVDD.

Even when the high-frequency ESD signal VESD is introduced through the power line 2 by being loaded into the constant voltage DVDD as illustrated in FIGS. 5 and 6, the capacitor C1 forms the short current ist as described above, and as a result, the first detection signal D1 may have a voltage of a low level which turns off the NMOS transistor Q1 of the first switching circuit 32.

The ESD detection circuit 20 is configured to detect a level of the ESD signal VESD introduced through the power line 2 and provide a voltage corresponding to a level of the ESD signal VESD exceeding a preset detection voltage, as the second detection signal D2.

To this end, the ESD detection circuit 20 is configured to include a level detector DL and a resistor R2 which are connected in series between the power line 2 and the ground line 4. The level detector DL may be understood as including a diode string in which a predetermined number of diodes are connected in series.

The level detector DL is connected to the power line 2, and is to detect a voltage by the ESD signal VESD exceeding the preset detection voltage. The level detector DL may have a preset turn-on condition, and is configured to be turned on when the ESD signal VESD exceeding the turn-on condition is applied thereto and provide, to the resistor R2, a current corresponding to a level of the ESD signal VESD exceeding the turn-on condition.

When the level detector DL is configured using the diode string, the turn-on condition of the level detector DL may be determined by the number of diodes included in the diode string and connected in series. The turn-on condition of the level detector DL corresponds to the preset detection voltage. The detection voltage of the level detector DL is denoted by VDL in FIGS. 2, 4 and 6.

The level detector DL may be configured even by one or more serially connected NMOS diodes, one or more serially connected PMOS diodes or a combination thereof. A level of the detection voltage VDL may be determined by a manufacturer, and depending on the level of the detection voltage VDL, the number of serially connected stages of diodes and a turn-on voltage of the NMOS diode or the PMOS diode may be determined.

The resistor R2 is connected between the level detector DL and the ground line 4.

The second detection signal D2 may be provided from a node between the level detector DL and the resistor R2. The second detection signal D2 may be understood as a voltage which is applied to the resistor R2 as the level detector DL is turned on or off.

That is to say, when the high-frequency and high-voltage ESD signal VESD is introduced through the power line 2 by being loaded into the constant voltage DVDD as illustrated in FIGS. 5 and 6, the level detector DL is turned on by the ESD signal VESD higher than the detection voltage VDL, and a voltage higher than the detection voltage VDL of the ESD signal VESD is applied to the resistor R2. At this time, the second detection signal D2 may have a voltage of a high level which turns off a PMOS transistor Q2 of a second switching circuit 34 to be described later, in response to the voltage applied to the resistor R2.

The pull-down control circuit 30 receives the first detection signal D1 and the second detection signal D2, and is configured between the power line 2 and the ground line 4.

The pull-down control circuit 30 is configured to pull down the ESD signal VESD of the power line 2, when the first detection signal D1 is provided to have a voltage corresponding to a current change occurred at a rising time point of the power noise VPN and the second detection signal D2 is provided to have a voltage corresponding to a level of the ESD signal VESD exceeding the detection voltage VDL.

To this end, the pull-down control circuit 30 is configured to include the first switching circuit 32, the second switching circuit 34 and a pull-down circuit 36.

The first switching circuit 32 is configured to be turned off when the first detection signal D1 is provided to have a voltage corresponding to a current change occurred at a rising time point of the power noise VPN or the ESD signal VESD. To this end, the first switching circuit 32 may be configured to include the NMOS transistor Q1.

The NMOS transistor Q1 is configured such that the first detection signal D1 is applied to a gate, the ground line 4 is connected to a source and a gate of an NMOS transistor Q3 to be described later is connected to a drain. Therefore, the NMOS transistor Q1 is turned on when the first detection signal D1 having a voltage of a high level is applied to the gate as the constant voltage DVDD is applied through the power line 2. The NMOS transistor Q1 is turned off when the first detection signal D1 having a voltage of a low level is applied to the gate as the high-frequency power noise VPN or ESD signal VESD is introduced through the power line 2.

The second switching circuit 34 is configured to be turned off when the second detection signal D2 is provided to have a voltage corresponding to a level of the ESD signal VESD exceeding the detection voltage VDL. To this end, the second switching circuit 34 may be configured to include the PMOS transistor Q2.

The PMOS transistor Q2 is configured such that the second detection signal D2 is applied to a gate, the ground line 4 is connected to a drain and the gate of the NMOS transistor Q3 is connected to a source.

Therefore, the PMOS transistor Q2 is turned on when the second detection signal D2 having a voltage of a low level is applied to the gate, and is turned off when the second detection signal D2 having a voltage of a high level is applied to the gate. The second detection signal D2 may be provided to have a voltage of a low level by the operation of the ESD detection circuit 20 when only the constant voltage DVDD is applied to the power line 2, the ESD signal VESD is not introduced into the power line 2 or the ESD signal VESD or the power noise VPN equal to or lower than the detection voltage VDL is introduced into the power line 2. The second detection signal D2 may be provided to have a voltage of a high level by the operation of the ESD detection circuit 20 when the ESD signal VESD exceeding the detection voltage VDL is introduced into the power line 2.

The pull-down circuit 36 is configured to maintain turn-off by turn-on of at least one of the first switching circuit 32 and the second switching circuit 34 and be turned on to pull down the ESD signal VESD of the power line 2 to the ground line 4 when both of the first switching circuit 32 and the second switching circuit 34 are turned off. To this end, the pull-down circuit 36 may be configured to include the NMOS transistor Q3.

The NMOS transistor Q3 is configured such that the drain of the NMOS transistor Q1 and the source of the PMOS transistor Q2 are connected to the gate, the ground line 4 is connected to a source and the power line 2 is connected to a drain.

Thus, when at least one of the NMOS transistor Q1 and the PMOS transistor Q2 is turned on, the potential of the gate of the NMOS transistor Q3 is formed at a low level by the ground voltage DVSS of the ground line 4, and the NMOS transistor Q3 maintains turn-off.

When both of the NMOS transistor Q1 and the PMOS transistor Q2 are turned off, the gate of the NMOS transistor Q3 is floated. The case where the gate of the NMOS transistor Q3 is floated corresponds to a case where the ESD signal VESD exceeding the detection voltage VDL is applied to the power line 2. Therefore, as the NMOS transistor Q3 is turned on by the high-voltage ESD signal VESD of the power line 2, the NMOS transistor Q3 forms a conductive electrical path between the power line 2 and the ground line 4, and as a result, the ESD signal VESD may be pulled down.

The operation of the embodiment of the present disclosure configured as illustrated in FIG. 1 may be described by being divided into a first case where the normal constant voltage DVDD is applied to the power line 2, a second case where the high-frequency power noise VPN is introduced through the power line 2, and a third case where the ESD signal VESD is introduced through the power line 2. The third case may also correspond to a case where the power noise VPN and the ESD signal VESD are introduced together through the power line 2.

First, the first case will be described below with reference to FIGS. 1 and 2.

In the first case, the high-frequency power noise VPN of a level capable of forming the short current ist in the capacitor C1 of the noise detection circuit 10 or the high-frequency ESD signal VESD of a level capable of turning on the level detector DL of the ESD detection circuit 20 does not exist in the power line 2. Therefore, the noise detection circuit 10 provides the first detection signal D1 having a voltage of a high level, and the ESD detection circuit 20 provides the second detection signal D2 having a voltage of a low level. The NMOS transistor Q1 is turned on by the first detection signal D1 having a voltage of a high level, and the PMOS transistor Q2 is turned on by the second detection signal D2 having a voltage of a low level. As a result, since the gate of the NMOS transistor Q3 is connected to the ground line 4 through the NMOS transistor Q1 and the PMOS transistor Q2, a voltage of a low level is applied to the gate of the NMOS transistor Q3, and the NMOS transistor Q3 maintains turn-off.

The second case will be described below with reference to FIGS. 3 and 4.

In the second case, the high-frequency power noise VPN capable of forming the short current ist in the capacitor C1 of the noise detection circuit 10 is introduced through the power line 2. Therefore, the noise detection circuit 10 provides the first detection signal D1 having a voltage of a low level corresponding to the short current ist of the capacitor C1. The power noise VPN does not have a level capable of turning on the level detector DL of the ESD detection circuit 20. Therefore, the ESD detection circuit 20 provides the second detection signal D2 having a voltage of a low level. The NMOS transistor Q1 is turned off by the first detection signal D1 having a voltage of a low level, and the PMOS transistor Q2 is turned on by the second detection signal D2 having a voltage of a low level. As a result, since the gate of the NMOS transistor Q3 is connected to the ground line 4 through the PMOS transistor Q2, a voltage of a low level is applied to the gate of the NMOS transistor Q3, and the NMOS transistor Q3 maintains turn-off.

The third case will be described below with reference to FIGS. 5 and 6.

In the third case, the ESD signal VESD having a high frequency capable of forming the short current ist in the capacitor C1 of the noise detection circuit 10 and having a level capable of turning on the level detector DL of the ESD detection circuit 20 is introduced through the power line 2. Therefore, the noise detection circuit 10 provides the first detection signal D1 having a voltage of a low level corresponding to the short current ist of the capacitor C1, and the ESD detection circuit 20 provides the second detection signal D2 having a voltage of a high level corresponding to the turn-on of the level detector DL. The NMOS transistor Q1 is turned off by the first detection signal D1 having a voltage of a low level, and the PMOS transistor Q2 is turned off by the second detection signal D2 having a voltage of a high level. As a result, the gate of the NMOS transistor Q3 is floated by the NMOS transistor Q1 and the PMOS transistor Q2 which are turned off.

The NMOS transistor Q3 whose gate is floated is turned on by the ESD signal VESD having a high voltage. Therefore, the NMOS transistor Q3 may form a turned-on path between the power line 2 and the ground line 4, and accordingly, the ESD signal VESD of the power line 2 may be pulled down by the discharge of static electricity through the path formed by the turn-on of the NMOS transistor Q3.

As is apparent from the above description, the present disclosure may distinguish the ESD signal VESD in high-frequency noise introduced through the power line 2, and may perform pull-down only on the ESD signal VESD.

Therefore, even in an environment including a motor with the severe power noise VPN, the ESD protection circuit may perform a stable operation for preventing the introduction of the ESD signal VESD, and as a result, the reliability of the operation of a micro control unit may be improved.

What is claimed is:

1. An ESD protection circuit comprising:
    a noise detection circuit configured to provide a first detection signal which detects high-frequency power noise or a high-frequency ESD signal introduced through a power line;
    an ESD detection circuit configured to provide a second detection signal which detects the ESD signal exceeding a preset detection voltage; and
    a pull-down control circuit configured to perform pull-down on the ESD signal of the power line when the first detection signal and the second detection signal are received,
    wherein the pull-down control circuit pulls down the ESD signal of the power line when the first detection signal is provided to have a voltage corresponding to a current change occurred at a rising time point of the power noise or the ESD signal and the second detection signal is provided to have a voltage corresponding to a level of the ESD signal exceeding the detection voltage,
    wherein the pull-down control circuit comprises:
        a first switching circuit configured to be turned off when the first detection signal is provided to have a voltage corresponding to the current change occurred at the rising time point of the power noise or the ESD signal,
        a second switching circuit configured to be turned off when the second detection signal is provided to have a voltage corresponding to a level of the ESD signal exceeding the detection voltage, and
        a pull-down circuit configured to maintain turn-off by turn-on of at least one of the first switching circuit and the second switching circuit, and be turned on to pull down the ESD signal of the power line to a ground line when both of the first switching circuit and the second switching circuit are turned off.

2. The ESD protection circuit according to claim 1, wherein the noise detection circuit detects a current change by the power noise or the ESD signal introduced through the power line, and provides the first detection signal corresponding to the current change when there is the current change.

3. The ESD protection circuit according to claim 2, wherein the noise detection circuit comprises:
    a resistor connected to the power line; and
    a capacitor connected between the resistor and a ground line,
    wherein, when the power noise is introduced into the resistor and the capacitor, a voltage, corresponding to the current change by a short current generated in the capacitor by the high-frequency power noise or the high-frequency ESD signal, is outputted as the first detection signal through a node between the resistor and the capacitor.

4. The ESD protection circuit according to claim 1, wherein the ESD detection circuit detects a level of the ESD signal, and provides a voltage, corresponding to a level of the ESD signal exceeding the detection voltage, as the second detection signal.

5. The ESD protection circuit according to claim 4, wherein the ESD detection circuit comprises:
    a level detector connected to the power line, and configured to detect a voltage of the ESD signal exceeding the detection voltage; and
    a resistor connected between the level detector and a ground line,
    wherein a voltage applied to the resistor by detection of the level detector is outputted as the second detection signal.

6. The ESD protection circuit according to claim 5, wherein the level detector comprises a diode string in which a predetermined number of diodes are connected in series.

7. The ESD protection circuit according to claim 1, wherein the pull-down circuit comprises an NMOS transistor which forms a path for pulling down the ESD signal of the power line to the ground line, as a gate thereof is floated when both of the first switching circuit and the second switching circuit are turned off.

8. An ESD protection circuit comprising:
    a noise detection circuit including a capacitor which is connected to a power line, and configured to output a first detection signal by a short current of the capacitor generated at a rising time point of power noise or an ESD signal introduced through the power line;
    an ESD detection circuit including a level detector which is connected to the power line, and configured to output a second detection signal corresponding to the ESD signal exceeding a detection voltage preset in the level detector;
    a first switching circuit configured to be turned off in response to the first detection signal;
    a second switching circuit configured to be turned off in response to the second detection signal; and
    a pull-down circuit configured to maintain turn-off by turn-on of at least one of the first switching circuit and the second switching circuit, and pull down the ESD signal of the power line when both of the first switching circuit and the second switching circuit are turned off.

9. The ESD protection circuit according to claim 8, wherein the noise detection circuit comprises:
    a resistor connected between the power line and the capacitor; and
    the capacitor connected between the resistor and a ground line,
    wherein the first detection signal by the short current of the capacitor generated at the rising time point of the power noise or the ESD signal is outputted through a node between the resistor and the capacitor.

10. The ESD protection circuit according to claim 8, wherein the ESD detection circuit comprises:
    the level detector connected to the power line; and a resistor connected to the level detector and a ground line, wherein a voltage applied to the resistor by detection of the level detector is outputted as the second detection signal.

11. The ESD protection circuit according to claim 10, wherein the level detector comprises a diode string in which a predetermined number of diodes are connected in series.

12. The ESD protection circuit according to claim 8, wherein the first switching circuit comprises a first NMOS transistor which is turned on by a charging voltage of the capacitor and is turned off by the first detection signal by the short current of the capacitor generated at the rising time point of the power noise or the ESD signal, the second switching circuit comprises a PMOS transistor which is turned on when the ESD signal exceeding the detection voltage does not exist and is turned off in response to the second detection signal corresponding to the ESD signal exceeding the detection voltage, and the pull-down circuit comprises a second NMOS transistor which maintains turn-off by turn-on of at least one of the first NMOS transistor and the PMOS transistor connected in parallel to a gate thereof and in which the gate is floated when both of the first NMOS transistor and the PMOS transistor are turned off.

* * * * *